B. M. JOHNSON.
PRESSURE-GAGE.
No. 192,373. Patented June 26, 1877.
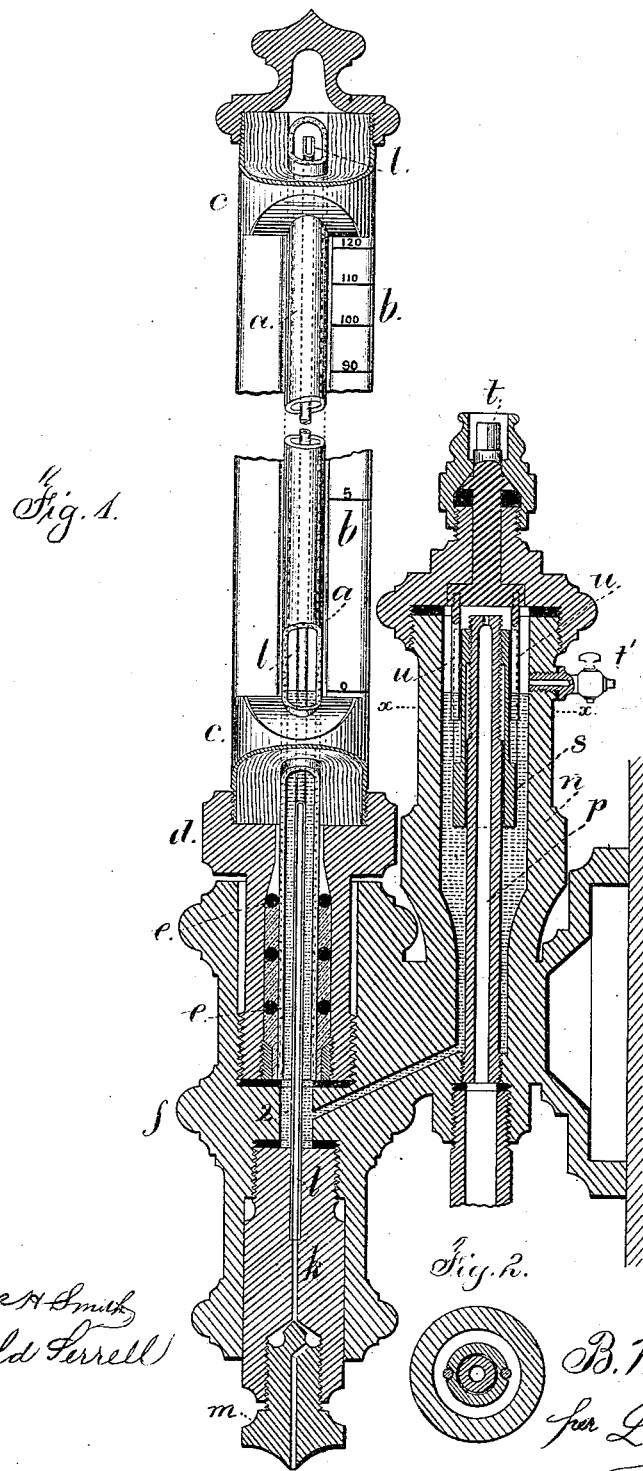

UNITED STATES PATENT OFFICE.

BRADBURY M. JOHNSON, OF BROOKLYN, NEW YORK.

IMPROVEMENT IN PRESSURE-GAGES.

Specification forming part of Letters Patent No. 192,373, dated June 26, 1877; application filed October 27, 1876.

*To all whom it may concern:*

Be it known that I, BRADBURY M. JOHNSON, of Brooklyn, Kings county, New York, have invented an Improvement in Pressure or Vacuum Gages, of which the following is a specification:

In gages where an inclosed column of mercury is elevated by pressure, there is a lack of accuracy in consequence of the inequality of atmospheric pressure rendering the level of the mercury at 0 or zero either too high or too low when the gage is not in use; and hence that same inaccuracy continues when the pressure is applied.

The object of the present invention is to equalize the atmospheric pressure inside and outside the mercury-tube, when the gage is at rest, and also to adjust the mercury, provided its bulk is changed by expansion or contraction, or from leakage or any other cause.

In the drawing, I have shown, in Figure 1, a vertical section of the said gage, and in Fig. 2 a sectional plan at the line $x\,x$.

The glass tube $a$ is placed against the division-plate $b$, and within the case $c$. At the lower end of the tube $a$ is a metal socket, $d$, receiving said tube, and into which it is secured by plaster and by the india-rubber rings $e\,e$. This socket $d$ is screwed into the body $f$ of the gage, and there is a packing at $g$.

The body $f$ of the gage is made as a chamber, 2, below the open lower end of the glass tube $a$, and beneath this is a screw-plug, $k$, to which is attached a small tube, $l$, preferably of platina, and this tube $l$ passes into and is of a length to reach nearly to the upper end of the glass tube $a$.

It is open at both ends, and a hole in the plug $k$ leads from this tube $l$ to the seat of the screw-valve $m$ in the plug $k$.

It will now be seen that when the gage is not in use the atmosphere can be admitted into the gage by slightly loosening the screw-valve $m$ and opening the cock $t'$; hence the pressure of air inside the tube $a$, and upon the surface of the mercury in the reservoir $n$, being equal, the mercury will fall to the 0 or zero-point, and the gage will be brought to a normal condition. If the air in the tube has been lessened from any cause it is replaced.

From the chamber 2 there is a passage to the mercury-reservoir $n$, that surrounds the tube $p$, through which the steam or other pressure reaches the top of the mercury in said reservoir $n$.

Within the chamber $n$ and around the tube $p$ is a displacer, $s$, that is screwed upon the outside of the tube $p$, and can be revolved by a key or crank applied upon the upper end of the stem $t$. Upon the lower end of this stem $t$ there are prongs $u$ that pass down into the displacer. The stem $t$ of the handle passes through a packing-gland, and it will be understood that by revolving the displacer $s$ by the stem $t$ and prongs $u$ it will be screwed up or down in the mercury in the reservoir $n$; hence, when the air-cock $t'$ is open, and the air-valve $m$ also open, the mercury will subside to the same level in the tube $a$ that it is in the reservoir $n$, and if the mercury-level does not correspond with the 0 mark on the index-plate it can be either raised or lowered by revolving the displacer $s$ to draw it partially out of or plunge it into the mercury in the reservoir $n$, and thus adjust the level of the mercury perfectly.

The plug $k$ may be removed for the purpose of giving access to the bottom of the glass tube $a$, so that the same may be cleaned from any accumulation of metallic oxide.

It will be seen that this gage may be used for a vacuum-gage, the air being exhausted from above the mercury through the tube $l$.

I claim as my invention—

1. The combination, with a pressure-gage, of the tube $l$ and valve $m$, substantially as and for the purposes set forth.

2. The chamber $n$ and tube $p$ within it, in combination with the displacer $s$ that is screwed upon the tube $p$, the stem $t$, and prongs $u$, passing into the displacer, substantially as and for the purposes set forth.

3. The combination, in a vacuum or pressure gage, of a glass tube closed at the upper end and a tube, $l$, within the same, open at the upper end above the highest level of the mercury, substantially as set forth.

Signed by me this 21st day of October, 1876.

BRADBURY M. JOHNSON.

Witnesses:
 GEO. T. PINCKNEY,
 CHAS. H. SMITH